March 3, 1931.   J. D. JONES   1,794,623
BEARING
Filed March 7, 1927   2 Sheets-Sheet 2
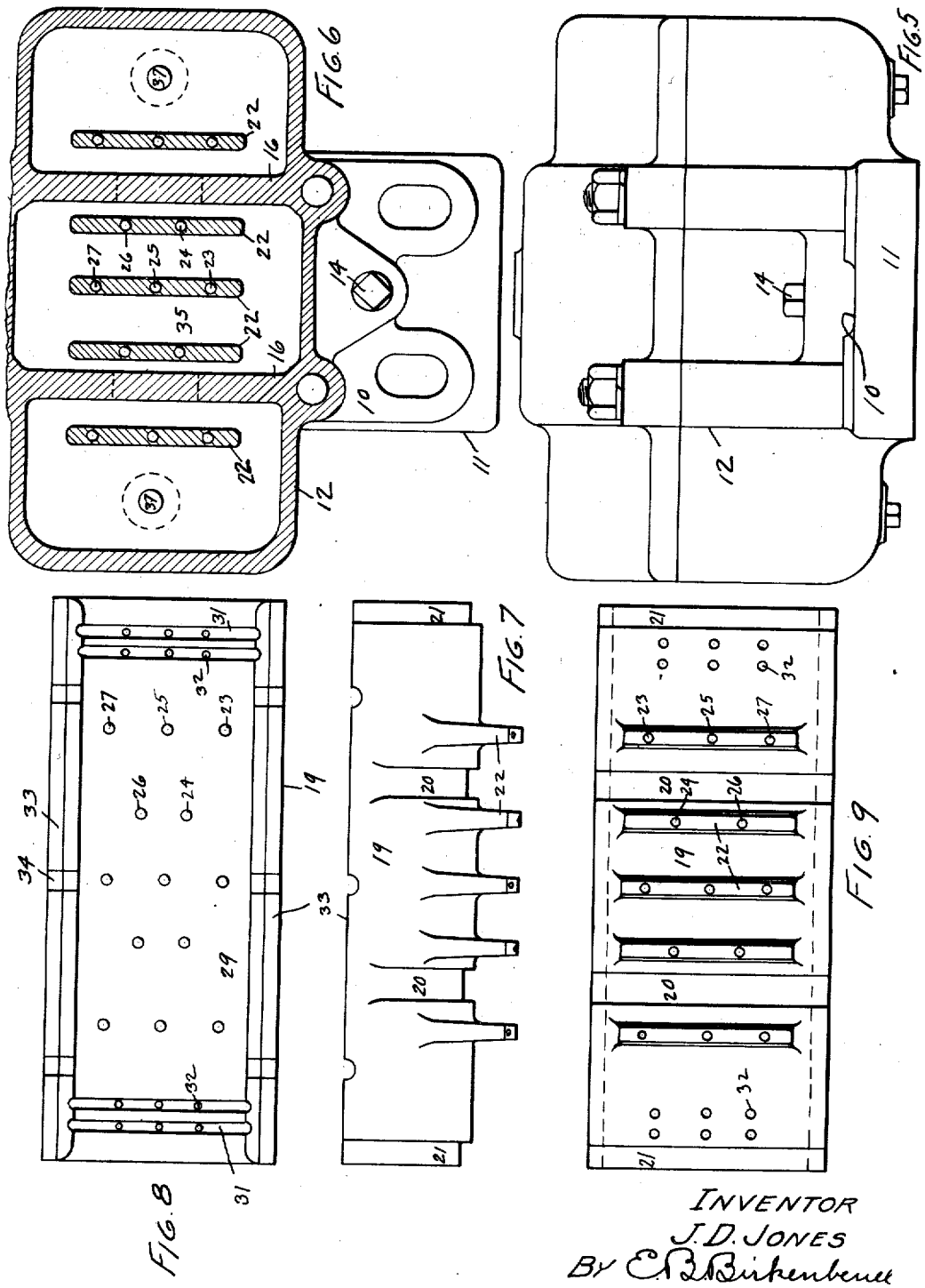
INVENTOR
J. D. JONES
By C. B. Birkenbeuel
ATTORNEY.

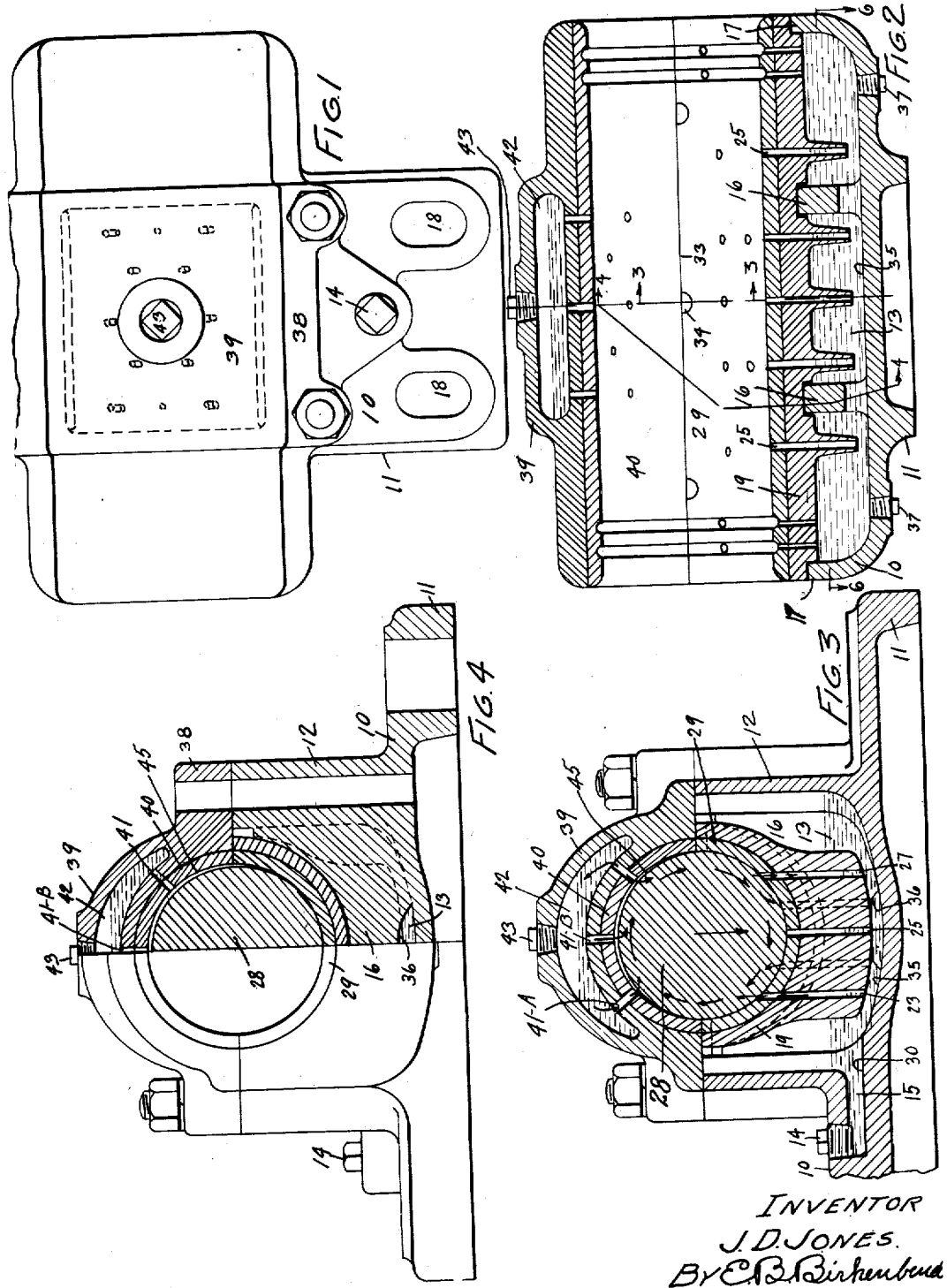

Patented Mar. 3, 1931

1,794,623

UNITED STATES PATENT OFFICE

JOHN D. JONES, OF PORTLAND, OREGON

BEARING

Application filed March 7, 1927. Serial No. 173,330.

This invention relates generally to bearings for shafts, and particularly to a special type of self-lubricating liner for use within bearings.

The main object of this invention is to provide an exceedingly simple, inexpensive and efficient type of self-lubricating bearing which requires very little machining and which will be extremely sturdy in proportion to its size and weight.

The second object is to provide a liner which permits the natural pumping action of the journal to take place from an open sump, either from a specially designed housing or from certain types of existing bearings in which this liner can be introduced.

The third object is to provide a bearing which will insure a perfect lubrication of a journal at all times for either direction of rotation and through a relatively large variety of angles of load, either in an upward or downward direction.

The fourth object is to insure perfect lubrication between a journal and bearing by causing a continuous circulation of oil to be maintained between the wearing surfaces thereof whenever the shaft is rotated.

The fifth object is to eliminate all danger of over-lubrication by preventing the introduction of more than the desired amount of oil into the storage space within the bearing.

The sixth object is to eliminate the need for drip pans, drain pipes, etc. by completely preventing the escape of oil from the ends of the bearing.

The seventh object is to so construct the bearing that the suction produced by nearby belts or other moving parts will not draw the oil out of the bearing.

The eighth object is to render the condition of the oil supply within the bearing easily visible and to make the need of replenishment very evident before it reaches a dangerous stage.

The ninth object is to provide a liner which will rigidly support the wearing surface of the bearing and effectively prevent endwise movement thereof.

These objects are accomplished in the manner set forth in the following specification as illustrated in the accompanying drawings, in which:

Figure 1 is a partial plan of the bearing of which Figure 2 is a longitudinal vertical section. Figure 3 is a vertical transverse section taken along the line 3—3 in Figure 2. Figure 4 is an end elevation of the bearing with a portion broken in transverse section along the line 4—4 in Figure 2. Figure 5 is a side elevation of the bearing. Figure 6 is a horizontal section taken along the line 6—6 in Figure 2. Figure 7 is a side elevation of the liner of which Figure 8 is a plan and Figure 9 a bottom view.

Similar numbers of reference refer to similar parts throughout the several views.

Referring in detail to the drawings, in order to illustrate this invention there is indicated a bearing provided with the usual base 10 whose sides 11 are downturned, and on whose upper side is formed a housing 12 which forms a sump for the oil 13 normally introduced into the sump through a filler hole which is closed by a plug 14 and communicates with the sump through the channel 15. Transversely across the housing are placed the saddle walls 16 which, in common with the end walls 17, are concave on their upper surfaces to receive the liner. The usual slots 18 are provided for bolts to hold the bearing base in place on its support.

Liner

The liner itself consists of an outer shell 19 whose under surface is provided with grooves 20 near its mid section which register with the saddle walls 16. At each end of the liner 19 is formed a similar offset 21 which rests upon the end walls 17 of the housing. The shoulders formed by the grooves 20 and the offset 21 affectively prevent endwise movement of the liner with relation to the housing 12.

Projecting downwardly from the liner 19 are a plurality of ribs 22 in which are formed vertical holes 23, 24, 25, 26 and 27 which communicate at their upper ends with the wearing surfaces between the shaft 28 and the bearing metal 29 of the liner 19, and the lower ends of the holes 23 to 27 open into the sump near the bottom thereof.

It will be observed that the lower line 30 of the channel 15 is above the lowermost ends of the holes 23 and 27 so that if the attendant removes the plug 14 and finds oil above the surface 30 he knows that there is sufficient oil present to provide proper lubrication. If, however, he finds no oil on the surface 30 he knows that it is high time to add more oil to the sump.

Near each end of the upper side of the liner 19 are formed the end grooves 31 which are provided with holes 32 through which oil which is working its way toward the end of the bearing is returned to the sump. Along the upper edges 33 of the liner 19 are formed the notches 34 which provide convenient return passageways for the surplus oil to the sump.

It will be observed that the ribs 22 do not touch the bottom 35 of the housing 12 and that openings 36 are formed through the lower portions of the wall 16 to permit a free passage of oil along the entire sump bottom 35. The bottom 35 is also provided with two drain plugs 37, only one of which is required, but which makes it possible to use which ever one is the most convenient.

It will be noted that the holes 23, 25 and 27 bear a staggered relation to the holes 24 and 26. Also that while the ribs 22 are transversely positioned that they may also be made longitudinal with the liner itself without departing from the spirit of the invention.

Cap for bearing

The cap for this bearing consists of the usual flanged portions 38 between which is formed a hollow cap 39 whose under side is lined with bearing metal 40 through which are formed the holes 41, 41—A and 41—B which communicate with the cavity 42. A plug 43 is provided for the opening in the cap 39, although this is never used to introduce oil into the bearing; all oil 44 within the cap 39 having found its way therein through the openings 41 or 41—A due to the pumping action about to be described.

Operation

The operation of this bearing is as follows: The sump having been filled with oil 13 and the plug 14 put back into place to prevent foreign matter from getting into the lubricant the bearing is rotated in the direction indicated by the arrow in Figure 4. Assuming that the load is directly downward, as indicated in Figure 3, oil will be drawn up through the holes 23 and 24 and carried between the wearing surfaces of the shaft 28 and the metal 29, and the major portion of same will be discharged through the opening 41—A. The bearing clearance 45 is greatly exaggerated in order to illustrate the operation of the bearing.

Oil now accumulates in the cavity 42 and is drawn back through the openings 41 around the opposite side of the shaft 28 from which it enters the bearing and is discharged through the holes 27 and 26. Under the condition just described there is very little movement of oil in either direction through the holes 25 or 41—B, but should the direction of load depart slightly from the vertical in either direction there will be a discharge of oil through these openings, the volume of which depends upon the degree of load deflection.

It is interesting to note that should the plug 43 be removed from this bearing that the oil will actually overflow from the top of the cap, but since this plug is kept in place there is a slight pressure built up within the cavity 42 above the oil present, which tends to force the oil through those openings through which oil is not entering the cavity 42 at that particular moment.

Owing to the generous circulation thus provided it has been found necessary to make it possible for the surplus of oil to return to the sump by way of the openings 32 and notches 34 in order that it may not be expelled from the bearing itself.

I have found in actual practice that when the upper ends of the inflow and outflow ducts (which are of relatively small cross-sectional area) at the respective sides of the maximum bearing surface are vertical, as herein shown, the action of the rotating shaft on the opposing viscous oil film effects a gradually increasing internal pressure of the oil at one side of such surface and a gradually diminishing pressure at the other side of the surface; the increasing pressure exerting a downward force directly above the openings adjacent thereto, and the diminishing pressure exerting a lifting or suction force directly above the openings adjacent thereto in such a manner as to produce a steady and uninterrupted circulation of oil between the lower reservoir and the journal opening, and this irrespective of the direction of rotation of the shaft.

I am aware that many different types of self-oiling bearings have been constructed in the past; I therefore do not claim such devices broadly, but I do not intend to cover all such forms and modifications thereof as fall fairly within the appended claims.

I claim:

1. A self-lubricating bearing having in combination a base having an oil reservoir formed therein, a lower half bearing liner mounted in said reservoir, said liner having independent vertical inflow and outflow ducts of relatively small cross-sectional area disposed on opposite sides of the maximum bearing surface, all said inflow and outflow ducts extending from the lowermost bearing surface of the liner to the interior of the oil reservoir below the oil level, and a cap for the top side of said bearing.

2. A self-lubricating bearing having in combination a base having an oil reservoir formed therein, a lower half bearing liner mounted in said reservoir, said liner having independent vertical inflow and outflow ducts of relatively small cross-sectional area disposed on opposite sides of the maximum bearing surface, all said inflow and outflow ducts extending from the lowermost bearing surface of the liner to the interior of the oil reservoir below the oil level, a cap for the top side of said bearing having a pressure chamber formed therein, and having a plurality of openings communicating between said pressure chamber and the uppermost portion of the bearing surface of the cap.

3. A bearing having an oil reservoir formed therein and having a removable liner mounted in said reservoir for supporting a shaft, said liner having projecting portions extending toward the bottom of said reservoir and having passageways formed therein communicating between the lowermost bearing surface of the liner and the lowermost portion of the reservoir, said passageways being disposed on opposite sides of the vertical center of the bearing, a cap for the top of said bearing having a pressure chamber formed therein, and having means for fastening same upon said base, said bearing having rings formed around the ends thereof provided with drain ducts for returning oil to said reservoir before it can escape from the ends of the bearing.

4. A removable pumping liner for horizontal bearings having the lowermost portion provided with a plurality of downwardly extending ribs, each of said ribs having a plurality of vertical oil passageways formed therein, one on the center line of the bearing and one on each side thereof, the uppermost portion of said liner having oil passageways radiating from its uppermost portion, and having a pressure chamber formed over the outlets of said openings whereby oil can be pumped from the lower reservoir into the upper chamber and discharged under pressure into the clearance space on the top side of the shaft being journaled therein.

5. A self-lubricating bearing for horizontal shafts having oil reservoirs on the top and bottom side thereof, said bearing having connecting oil passageways comprising independent vertical inflow and outflow ducts of relatively small cross-sectional area disposed on opposite sides of the maximum bearing surface and extending from the lowermost bearing surface to the bottom of the lower reservoir, and comprising also independent spaced openings between the uppermost bearing surface and the bottom of the upper reservoir.

6. A self-lubricating horizontal bearing consisting of a base having a reservoir formed therein and having a saddle formed in said reservoir, a removable liner forming the lower half of said bearing mounted in said saddle and having extensions formed on the lower side thereof extending downwardly into said reservoir and near the middle of the length of said liner, said extensions having a plurality of holes formed therein on opposite sides of the center of the bearing communicating between its lowermost bearing surface and the bottom of the reservoir, means for filling said reservoir whereby its oil level can be held below the lowermost bearing surface and above the lower ends of said oil holes, the top edges of said liner having notches formed therein through which an excess of oil can return to the reservoir without escaping from the ends of the bearing, an upper cap for said bearing and liner having a pressure-tight compartment formed therein, and having a plurality of openings connecting said compartment with the uppermost portion of the upper cap lining, and means for holding said upper cap in a journaling position.

7. A self-lubricating bearing having an opening for the journal of a shaft, an oil reservoir arranged and adapted to contain oil at a level below the lowermost bearing surface for the journal, and independent inflow and outflow ducts of relatively small cross-sectional area disposed on opposite sides of the maximum bearing surface, all said inflow and outflow ducts extending from the journal opening to the oil reservoir and below the oil level and being vertically disposed at their points of communication with the journal opening.

8. A self-lubricating bearing having an opening for the journal of a shaft, an oil reservoir arranged and adapted to contain oil at a level below the lowermost bearing surface for the journal, and independent vertical inflow and outflow ducts of relatively small cross-sectional area disposed on opposite sides of the maximum bearing surface, all said inflow and outflow ducts extending from the journal opening to the oil reservoir.

9. A self-lubricating bearing comprising a base having an oil reservoir formed therein, a removable liner mounted in said reservoir for supporting a shaft, said liner having independent vertical ducts of relatively small cross-sectional area affording communication between the lowermost bearing surface of the liner and the lower portion of the reservoir and being disposed on opposite sides of the maximum bearing surface, and a bearing cap having means for fastening it on said base, said bearing having rings formed around the ends thereof provided with drain ducts for returning oil to said reservoir before the oil can escape from the ends of the bearing.

10. A self-lubricating bearing comprising a base having an oil reservoir formed therein, a removable liner, mounted in said reservoir for supporting a shaft, said liner having independent vertical ducts of relatively small cross-sectional area affording communication between the lowermost bearing surface of the liner and the lowermost portion of the reservoir, and being disposed on opposite sides of the maximum bearing surface, the top edges of said liner having notches formed therein through which excess oil can return to the reservoir without escaping from the ends of the bearing, and a cap for the top of the bearing.

JOHN D. JONES.

10. A self-lubricating bearing comprising a base having an oil reservoir formed therein, a removable liner, mounted in said reservoir for supporting a shaft, said liner having independent vertical ducts of relatively small cross-sectional area affording communication between the lowermost bearing surface of the liner and the lowermost portion of the reservoir, and being disposed on opposite sides of the maximum bearing surface, the top edges of said liner having notches formed therein through which excess oil can return to the reservoir without escaping from the ends of the bearing, and a cap for the top of the bearing.

JOHN D. JONES.

CERTIFICATE OF CORRECTION.

Patent No. 1,794,623.   Granted March 3, 1931, to

JOHN D. JONES.

It is hereby certified that error appears in the printed specification of the above numbered patent requiring correction as follows: Page 2, line 118, strike out the word "not"; and that the said Letters Patent should be read with this correction therein that the same may conform to the record of the case in the Patent Office.

Signed and sealed this 31st day of March, A. D. 1931.

(Seal)

M. J. Moore,
Acting Commissioner of Patents.

CERTIFICATE OF CORRECTION.

Patent No. 1,794,623. Granted March 3, 1931, to

JOHN D. JONES.

It is hereby certified that error appears in the printed specification of the above numbered patent requiring correction as follows: Page 2, line 118, strike out the word "not"; and that the said Letters Patent should be read with this correction therein that the same may conform to the record of the case in the Patent Office.

Signed and sealed this 31st day of March, A. D. 1931.

(Seal)

M. J. Moore,
Acting Commissioner of Patents.